US010040560B2

(12) United States Patent
Willie et al.

(10) Patent No.: US 10,040,560 B2
(45) Date of Patent: Aug. 7, 2018

(54) TRAILING EDGE CORE COMPARTMENT VENT FOR AN AIRCRAFT ENGINE

(71) Applicant: The Boeing Company, Chicago, IL (US)

(72) Inventors: Robert H. Willie, Bothell, WA (US); Paul R. Tretow, Mukilteo, WA (US); David F. Cerra, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 197 days.

(21) Appl. No.: 14/870,401

(22) Filed: Sep. 30, 2015

(65) Prior Publication Data

US 2017/0088275 A1    Mar. 30, 2017

(51) Int. Cl.
| | |
|---|---|
| *B64D 33/04* | (2006.01) |
| *B64D 27/12* | (2006.01) |
| *B64D 29/00* | (2006.01) |
| *F02K 1/82* | (2006.01) |
| *F02K 3/04* | (2006.01) |
| *F01D 25/26* | (2006.01) |
| *F02K 1/38* | (2006.01) |
| *F02C 7/18* | (2006.01) |

(52) U.S. Cl.
CPC ............. *B64D 27/12* (2013.01); *B64D 29/00* (2013.01); *F01D 25/26* (2013.01); *F02C 7/18* (2013.01); *F02K 1/38* (2013.01); *F02K 1/82* (2013.01); *F02K 1/822* (2013.01); *F02K 3/04* (2013.01); *F05D 2220/36* (2013.01); *F05D 2240/128* (2013.01); *F05D 2260/605* (2013.01); *F05D 2260/608* (2013.01); *Y02T 50/671* (2013.01); *Y02T 50/675* (2013.01)

(58) Field of Classification Search
CPC ........ B64D 27/00; B64D 27/06; B64D 27/10; B64D 27/12; B64D 27/16; B64D 27/18; B64D 29/00; B64D 29/02; B64D 33/00; B64D 33/04; B64D 2033/0266; B64D 2033/0286; F02K 1/38; F02K 1/40; F02K 1/82; F02K 3/04; F02K 3/06
See application file for complete search history.

(56) References Cited

U.S. PATENT DOCUMENTS 3,527,317 A * 9/1970 Motsinger ................. F02K 1/34
                                                                       181/206
3,780,827 A * 12/1973 Straight .................... F02K 1/38
                                                                       181/216

(Continued)

OTHER PUBLICATIONS

Extended European Search Report for EP Appl. No. 16177843.6 dated Feb. 22, 2017.

*Primary Examiner* — Tien Dinh
*Assistant Examiner* — Michael A. Fabula
(74) *Attorney, Agent, or Firm* — MH2 Technology Law Group LLP

(57) ABSTRACT

A turbine engine nozzle can include a primary outer wall extending from an engine core area to an annular wall terminus that surrounds an engine tail cone, to form a core nozzle. The turbine engine nozzle also includes a single engine core cowl extending from the engine core area to an annular cowl terminus to form a core compartment vent nozzle. The core compartment vent nozzle exhausts air from a core compartment in a trailing edge between the single engine core cowl and the primary outer wall.

14 Claims, 6 Drawing Sheets

(56) References Cited

U.S. PATENT DOCUMENTS

| | | | | |
|---|---|---|---|---|
| 3,946,830 A * | 3/1976 | Kutney | ............... | B64D 33/02 137/15.1 |
| 3,964,568 A * | 6/1976 | Neumann | ............... | F02C 7/045 181/216 |
| 3,964,569 A * | 6/1976 | Neumann | ............... | F02C 7/045 181/214 |
| 4,080,785 A * | 3/1978 | Koff | ............... | F02K 3/075 415/69 |
| 5,056,307 A * | 10/1991 | Liang | ............... | B64D 33/04 60/226.1 |
| 5,860,276 A * | 1/1999 | Newton | ............... | F02C 7/20 60/226.1 |
| 6,227,800 B1 * | 5/2001 | Spring | ............... | F01D 11/24 415/116 |
| 7,726,116 B2 * | 6/2010 | Kemper | ............... | F02K 1/085 60/226.1 |
| 9,347,397 B2 * | 5/2016 | Khan | ............... | F02K 1/28 |
| 2004/0187476 A1 * | 9/2004 | Lair | ............... | B64D 33/04 60/226.1 |
| 2008/0110154 A1 * | 5/2008 | Kemper | ............... | F02K 1/085 60/226.3 |
| 2008/0131276 A1 * | 6/2008 | Alade | ............... | F02K 1/38 415/209.4 |
| 2008/0141656 A1 * | 6/2008 | Beutin | ............... | F01D 9/065 60/262 |
| 2008/0202847 A1 * | 8/2008 | Porte | ............... | F02K 1/386 181/213 |
| 2008/0236138 A1 * | 10/2008 | Gustafsson | ............... | B64D 33/04 60/226.1 |
| 2009/0007567 A1 * | 1/2009 | Porte | ............... | F02C 7/141 60/785 |
| 2010/0170984 A1 * | 7/2010 | Journade | ............... | B64D 29/08 244/1 N |
| 2010/0186369 A1 * | 7/2010 | Crosta | ............... | F02K 1/46 60/226.1 |
| 2010/0218483 A1 * | 9/2010 | Smith | ............... | F01D 17/10 60/262 |
| 2011/0133035 A1 * | 6/2011 | Vauchel | ............... | B64D 29/00 244/134 D |
| 2011/0308634 A1 * | 12/2011 | Mouton | ............... | B64D 29/06 137/15.1 |
| 2013/0205798 A1 * | 8/2013 | Kwok | ............... | F02K 1/00 60/783 |
| 2014/0037443 A1 * | 2/2014 | Khan | ............... | F02K 1/00 415/211.2 |
| 2014/0263712 A1 * | 9/2014 | Froemming | ............... | F02K 1/36 239/11 |
| 2015/0291285 A1 * | 10/2015 | Gallet | ............... | F01D 13/02 415/60 |
| 2016/0003187 A1 * | 1/2016 | Roberge | ............... | F02K 3/02 415/1 |
| 2016/0131038 A1 * | 5/2016 | Warnet | ............... | F02C 7/18 415/148 |

* cited by examiner

TRAILING EDGE CORE COMPARTMENT VENT FOR AN AIRCRAFT ENGINE

BACKGROUND

Currently, aircraft engine nozzles vent the core compartment air through an aft annular vent. Typically, the core compartment vent separates the engine core cowl into a forward and aft portion. In the conventional arrangement, the primary nozzle outer wall may be subject to high sonic fatigue loads and may need to be thicker to compensate for the high sonic fatigue loads. Additionally, an aft fairing heat shield may need to be designed to allow for a gap between it and the primary nozzle outer wall. Due to the longer nozzles, aft fairings and their heat shields may need to be longer.

SUMMARY

Aspects of the present disclosure concern a turbine engine nozzle. The turbine engine nozzle includes a primary outer wall extending from an engine core area to an annular wall terminus that surrounds an engine tail cone, to form a core nozzle. The turbine engine nozzle also includes a single engine core cowl extending from the engine core area to an annular cowl terminus to form a core compartment vent nozzle. The core compartment vent nozzle exhausts air from a core compartment in a trailing edge between the single engine core cowl and the primary outer wall.

Aspects of the present disclosure concern an aircraft engine. The aircraft engine includes a ducted fan comprising a fan airflow exit for exhausting a fan air flow and a turbine engine core. The turbine engine core includes a core nozzle for exhausting a core air flow from the turbine engine core. The turbine engine core also includes a core compartment vent nozzle for exhausting core compartment vent air flow from a core compartment. The core compartment vent nozzle exhausts core vent air from a trailing edge between the fan air flow and the core air flow.

Aspects of the present disclosure concern aircraft. The aircraft includes an aircraft body comprising a fuselage and at least one wing and at least one aircraft engine. At least one aircraft engine includes a ducted fan comprising a fan airflow exit for exhausting a fan air flow and a turbine engine core. The turbine engine core includes a core nozzle for exhausting a core air flow from the turbine engine core. The turbine engine core also includes a core compartment vent nozzle for exhausting core compartment vent air flow from a core compartment vent. The core compartment vent nozzle exhausts core compartment vent air from a trailing edge between the fan air flow and the core air flow.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Figure 1:
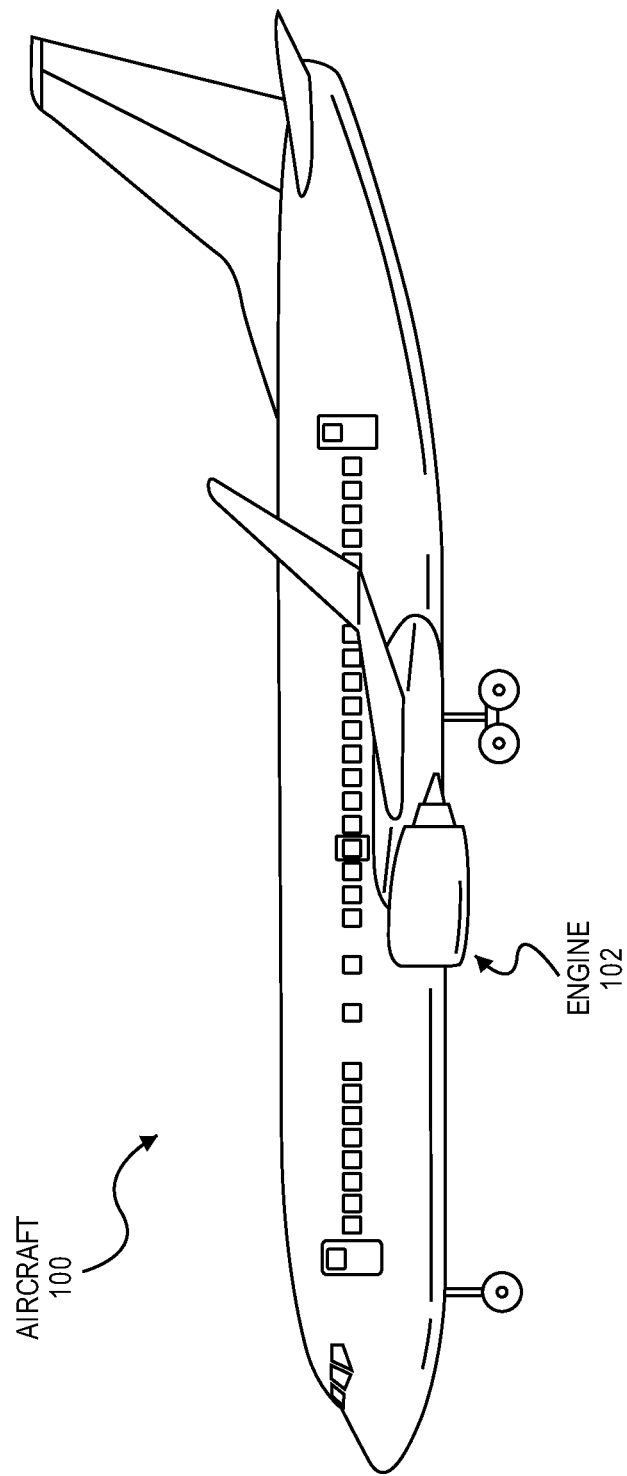
FIG. 1 illustrates an example of an aircraft, according to various aspects of the present disclosure.

FIG. 1 illustrates an example of an aircraft 100 in which an engine 102 can include components packaged into a smaller and lighter configuration by combining the trailing edge of the core cowl with the core compartment aft annular vent to reduce weight and improve performance, according to aspects of the present disclosure. While FIG. 1 illustrates various components contained in the aircraft 100, FIG. 1 illustrates one example of an aircraft and additional components can be added and existing components can be removed.

As illustrated in FIG. 1, the aircraft 100 can include the engine 102. The engine 102 can provide propulsion for the aircraft 100 and power for electrical systems of the aircraft 100. The engine 102 can be any type of aircraft engine, for example, a turbofan (or fan jet) engine. While FIG. 1 illustrates one engine, the aircraft 100 can include any number of engines that are required by the aircraft 100. As illustrated in FIG. 1, the engine 102 can be coupled to a wing of the aircraft 100. While FIG. 1 illustrates the engine 102 being coupled to a wing, the engine 102 can be positioned at any location on the aircraft 100 as required.

In aspects, the engine 102 can be any type of aircraft engine, for example, a turbofan engine. For example, for a turbofan, the engine 102 can include a turbine engine (also referred to as the core) and a ducted fan. The turbine can take mechanical energy from combustion and convert the energy to propulsion. The ducted fan can use the mechanical energy from the turbine to accelerate air rearwards. In this example, the fan portion of air, passing through the engine 102, can bypass the core. Both the fan air and the core air can contribute to the thrust. The engine 102 can produce thrust through a combination of these two portions working in concert. The engine 102 can also route a portion of the air through components of the engine 102 via a core compartment vent. This compartment requiring vent flow can be termed the core compartment because it surrounds the engine core and it contains many components that are required for engine operation. Many of these components can require cooling air flow in order to remain below their respective temperature limits. According to aspects of the present disclosure, the components can be packaged into a smaller and lighter configuration by combining the trailing edge of the core cowl with the core compartment aft annular vent to reduce weight and improve performance. The core compartment vent can provide cooling to the components of the engine 102.

Figure 2A:
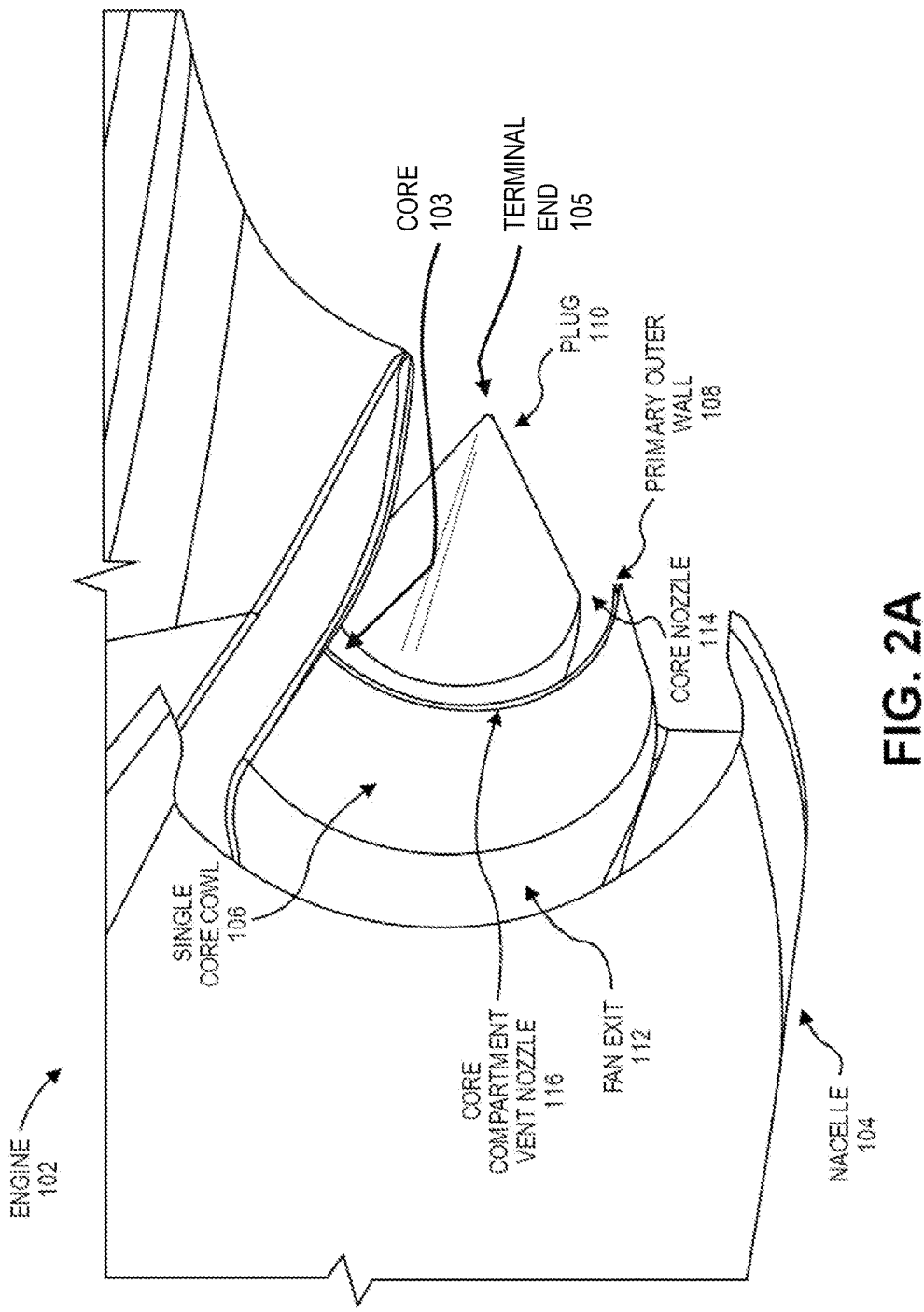
FIGS. 2A and 2B illustrate a three dimensional (3D), partial view of the engine for an aircraft, according to various aspects of the present disclosure.
Figure 2B:
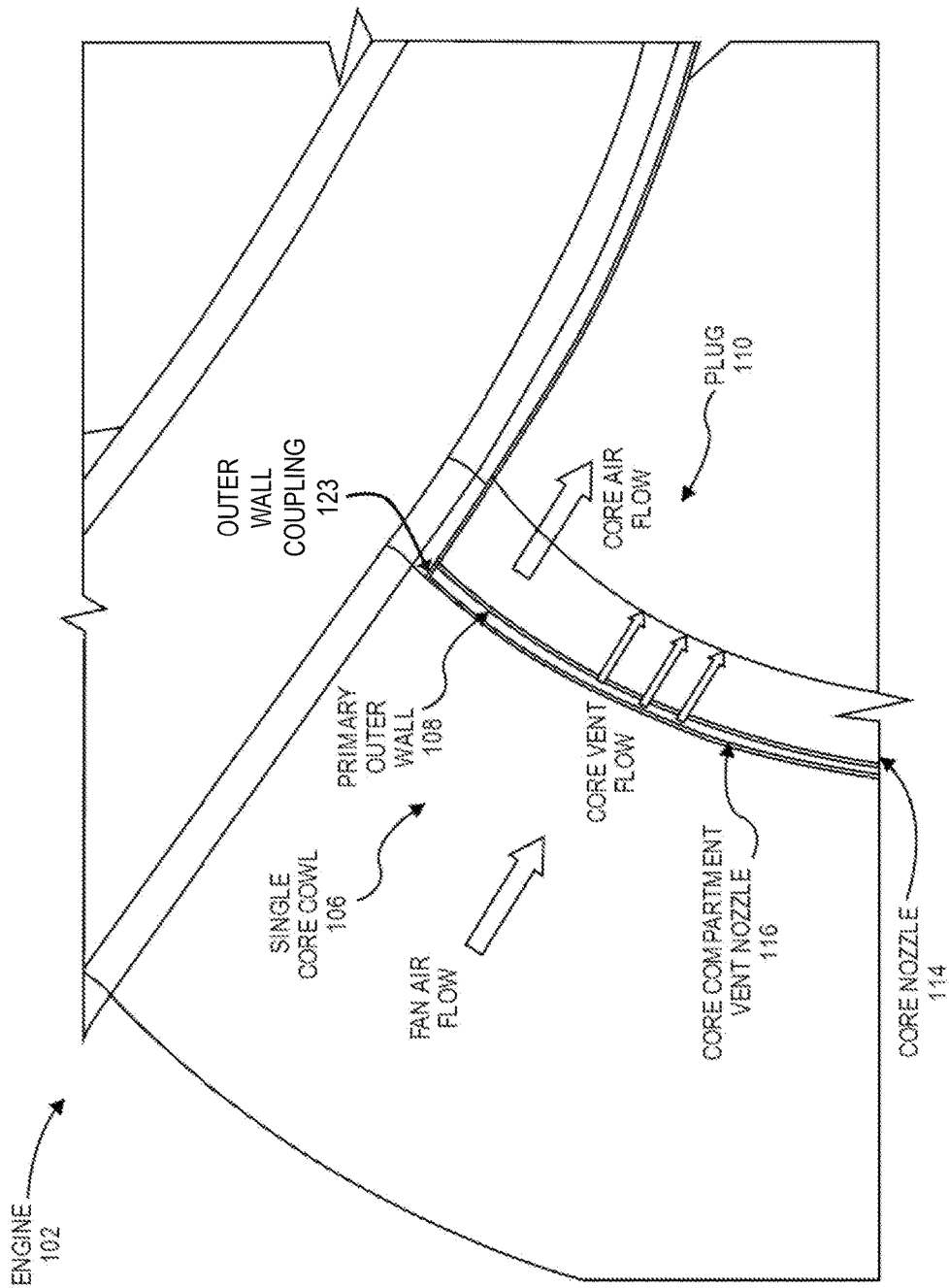

FIGS. 2A and 2B illustrate a three dimensional (3D), partial view of the turbofan engine 102, according to aspects of the present disclosure. While FIGS. 2A and 2B illustrate various components contained in the engine 102, FIGS. 2A and 2B illustrate one example of an engine 102 and additional components can be added and existing components can be removed. Additionally, while FIGS. 2A and 2B only shows half of the engine 102, it is understood that the engine 102 includes an additional half that can be symmetrically formed as the half illustrated.

As illustrated in FIG. 2A, the engine 102 can include an engine cover 104, commonly referred to as a nacelle. The nacelle 104 can be configured in a cylindrical shape. The nacelle 104 can cover the components of the engine 102. The nacelle 104 can be constructed of any material to provide a structural covering for the engine 102.

The engine 102 can include a core gas turbine engine 103 (also referred to herein as an engine core or "core"). The core 103 can include a turbine and associated systems that control and power the turbine. The core 103 can be constructed of any material to provide the functionality of the core 103. The core 103 can be located inside the nacelle 104. The annulus between the nacelle 104 and the core can form the bypass path for the air flow from the fan of the engine 102. The nacelle 104 and the core 103 can form a fan exit 112 at a terminal portion of the nacelle 104. The air from the bypass path can exit from the fan exit 112.

The engine 102 can include a single core cowl 106. The single core cowl 106 can be coupled to the terminal end of the core. The single core cowl 106 can be formed in any shape as required for the design of the engine 102. For example, the single core cowl 106 can be formed in a cylindrical or conical shape. The single core cowl 106 can be constructed of any material to provide the functionality of the single core cowl 106.

The engine 102 can also include a primary outer wall 108. The primary outer wall 108 can be formed in any shape as required for the design of the engine 102. For example, the primary outer wall 108 can be formed in a cylindrical or conical shape. The primary outer wall 108 can define the airflow path for the primary or core air. The primary outer wall 108 can be constructed of any material to provide the functionality of the primary outer wall 108. The engine 102 can also include a plug (or tail cone) 110. The plug 110 can be constructed of any material to provide the functionality of the plug 110. The primary outer wall 108 and the plug 110 can form a core nozzle 114. The core nozzle 114 can direct the core air flow from the turbine out the rear of the engine 102.

In aspects, the annulus between the single core cowl 106 and the primary outer wall 108 can form a core compartment vent nozzle 116 and can be coupled 123 to the engine core 103. The core compartment vent nozzle 116 can be configured to vent the core compartment vent flow from the core compartment 102 through a large trailing edge region between the fan flow and the core air flow as shown in FIG. 2B. As illustrated in FIG. 2B, the core compartment vent nozzle 116 forms a circular annulus around the complete circumference of the rear of the engine 102. The core compartment vent flow can be vented around the entire circumference of the engine into the trailing edge between the fan air flow and the core air flow.

Figure 3:
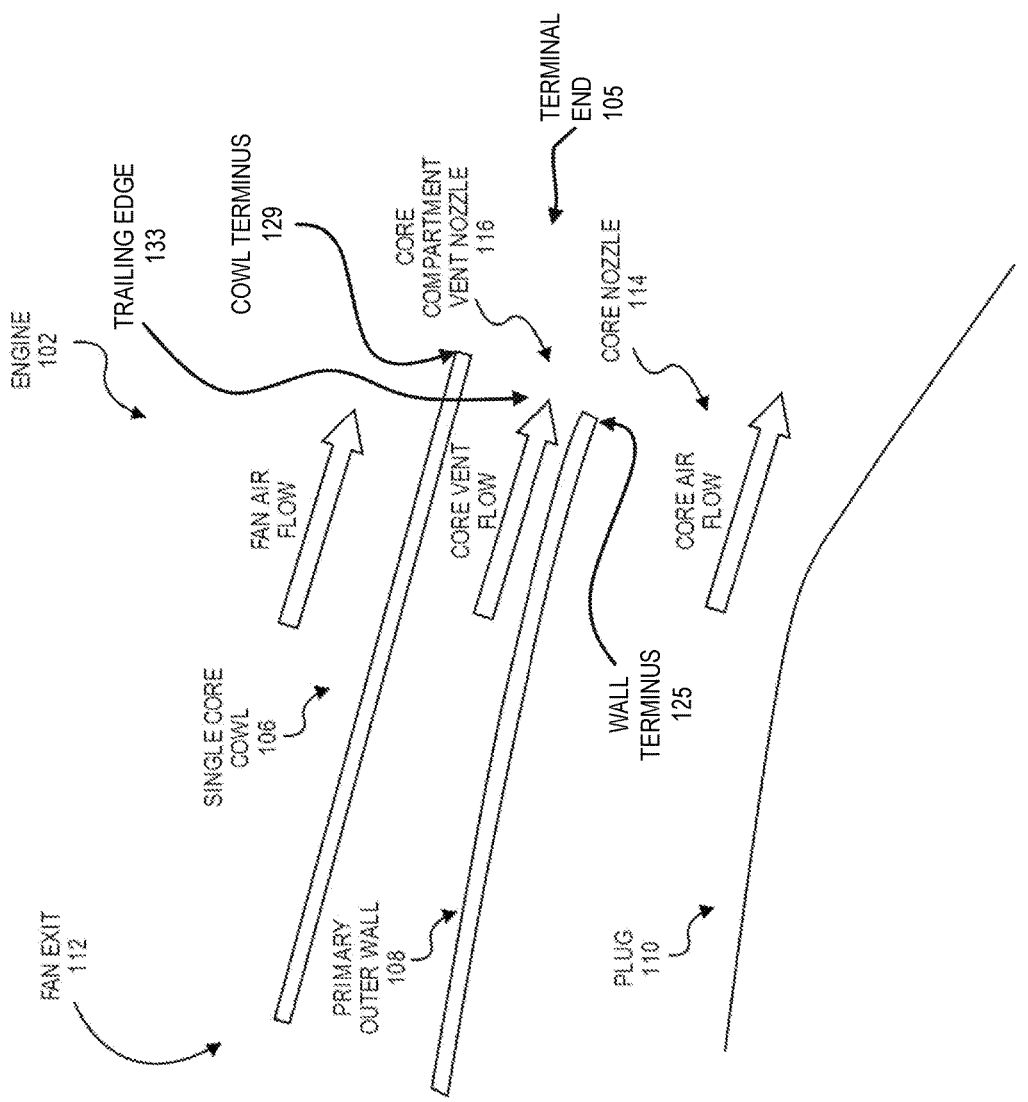
FIG. 3 illustrates a two dimensional (2D) cross-sectional view of the engine for an aircraft, according to various aspects of the present disclosure.

FIG. 3 illustrates a two dimensional (2D) cross-sectional view of the engine 102, according to aspects of the present disclosure. While FIG. 3 illustrates various components contained in the engine 102, FIG. 3 illustrates one example of an aircraft engine and additional components can be added and existing components can be removed.

As illustrated in FIG. 3, the annulus between single core cowl 106 and the primary outer wall 108 can form the core compartment vent nozzle 116. The core compartment vent nozzle 116 can be configured to vent the air flow from the core compartment through a large trailing edge 133 between the fan flow and the core flow. In some aspects, the terminal end 129 of the single core cowl 106 and the terminal end 125 of the primary outer wall 108 can be formed to have approximately planar alignment. In some aspects, the terminal end 129 of the single core cowl 106 can be formed to be recessed from the terminal end 125 of the primary outer wall 108.

Figure 4:
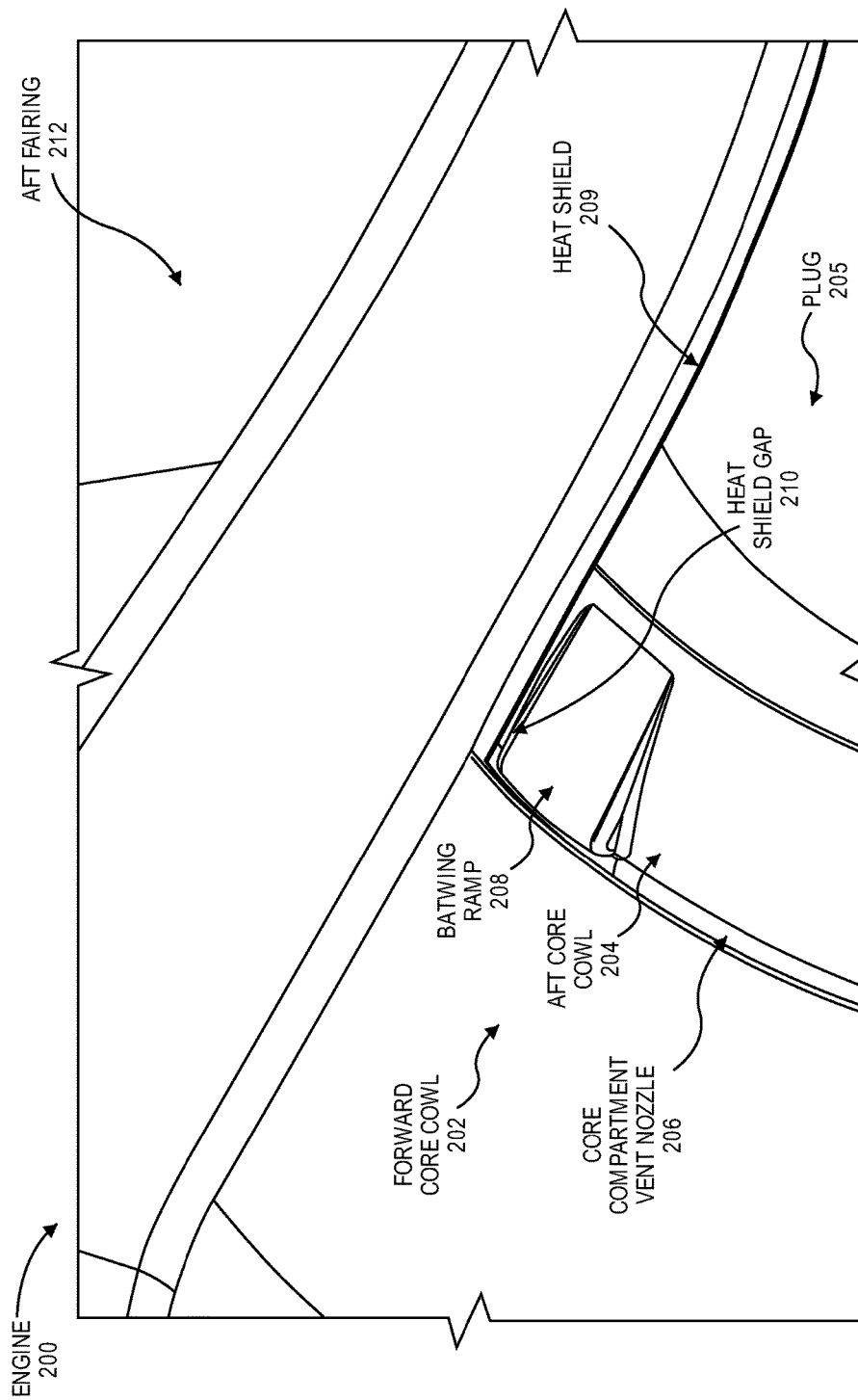
FIG. 4 illustrates an example of a conventional core compartment vent arrangement.

FIG. 4 illustrates an example of a conventional core compartment vent arrangement of a conventional engine 200. As illustrated in FIG. 4, the conventional core compartment vent arrangement of the conventional engine 200 includes a forward core cowl 202 and an aft core cowl 204. The forward core cowl 202 and the aft core cowl 204 form a core compartment vent nozzle 206. Additionally, the conventional core compartment vent of the conventional engine 200 includes a batwing ramp 208. The conventional engine 200 also includes a heat shield 209 that forms a heat shield gap 210. The conventional engine 200 also includes an aft fairing 212. In the conventional vent arrangement, the core nozzle outer wall may be subject to sonic fatigue issues and may need to be of greater thickness to compensate for the high thermal loads. Additionally, an aft fairing heat shield may need to be designed to allow for a gap between it and the core nozzle outer wall to accommodate relative motion between the engine and the aft fairing (not numbered) and heat shield (not numbered). Due to the longer nozzles, aft fairings and their heatshields may need to be longer.

Figure 5A:
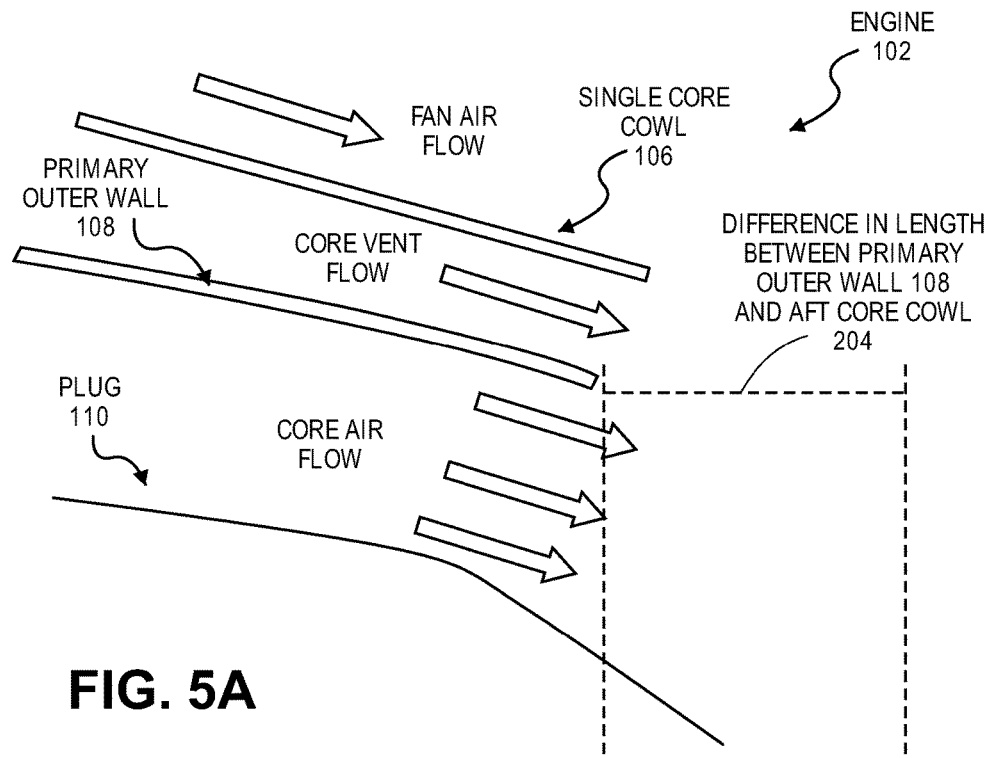
FIGS. 5A and 5B illustrate a comparison between a conventional engine and aspects of the present disclosure.
Figure 5B:
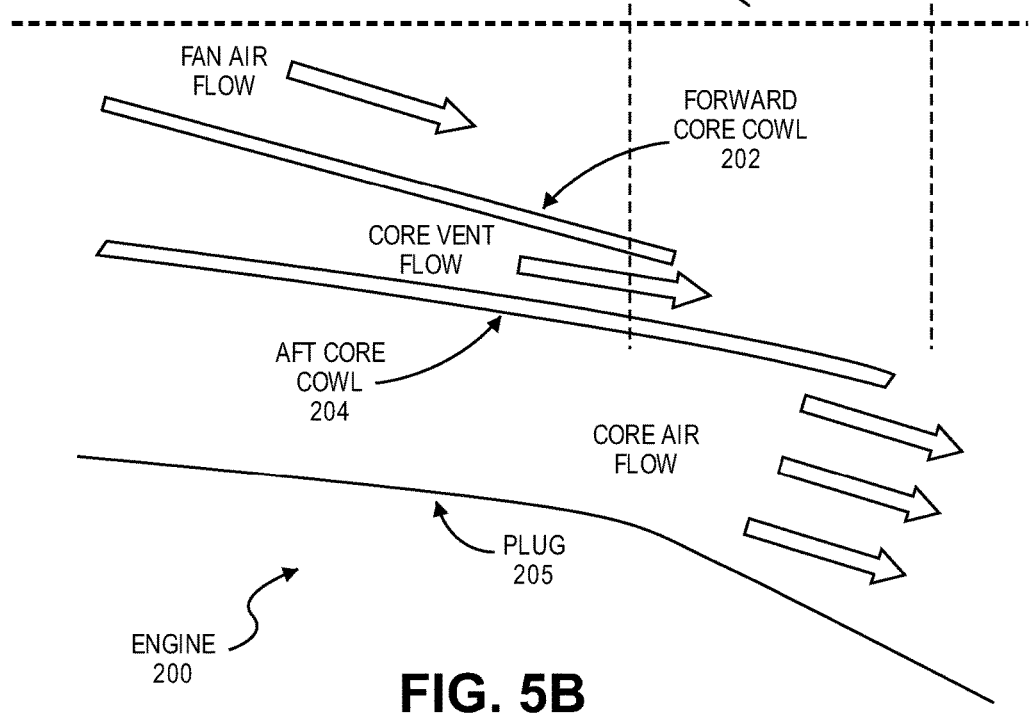

In aspects, as discussed above in FIGS. 2A, 2B, and 3, the core compartment air will exhaust in a trailing edge between the single core cowl 106 and the primary outer wall 108. FIGS. 5A and 5B illustrate an example of the difference between the airflow in engine 102 shown in FIG. 5A and the conventional engine 200 shown in FIG. 5B. As illustrated in FIG. 5B, the conventional engine can include the forward core cowl 202, the aft core cowl 204, and the plug 205. As illustrated in FIG. 5A (and discussed above with reference to FIG. 3), the engine 102 can include the single core cowl 106, the primary outer wall 108, and the plug 110. In the engine 102, when compared to the conventional engine 200, the aft core cowl 204 can be removed, and the core compartment vent can be exhausted through a large trailing edge between the fan flow and the core flow. Additionally, the typical gap between the aft fairing heat shield and core nozzle can be eliminated due to the lack of relative motion between the single core cowl 106 and the aft fairing (not numbered). The batwing ramps 208 that transition fan air from the forward core cowl 202 to the aft core cowl 204 can be removed.

As such, the engine 102 can allow for a shorter core nozzle, elimination of the aft core cowl, elimination of the core nozzle to heat shield gap and simplification of the core nozzle. For example, as illustrated in FIG. 5A, the removal of the aft core cowl 204 allows a difference in length of the primary out wall 108 as compared to the aft core cowl 204. That is, the primary outer wall 108 of the engine 102 can be shorter than the aft core cowl 204 in the conventional engine 200. In engine 102, the core nozzle 114 may be exposed to reduced thermal stresses and may be shorter and lighter. Additionally, the plug 110 may be shorter and lighter. Due to the expected reduction in length, the nozzle would be lighter. Due to the reduced length, the aft fairing may also be shorter and lighter. Thus, the engine 102 may enable reduced weight and higher nozzle performance through reduced frictional surface losses.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A turbine engine nozzle, comprising:
a primary outer wall directly coupled to a trailing end of an engine core and extending from an engine core area to an annular wall terminus that surrounds an engine tail cone, the primary outer wall forming a core nozzle; and
a single engine core cowl extending from the engine core area to an annular cowl terminus, the single engine core cowl forming a core compartment vent nozzle,
wherein:
the core compartment vent nozzle is configured to exhaust air from a core compartment in a trailing edge between the single engine core cowl and the primary outer wall,
the annular cowl terminus is in substantially planar alignment with the annular wall terminus, and
at the trailing edge between the single engine core cowl and the primary outer wall, the primary outer wall is substantially parallel to the single engine core cowl.

2. The turbine engine nozzle of claim 1, wherein the core compartment vent nozzle comprises an annulus between the annular cowl terminus of the single engine core cowl and annular wall terminus of the primary outer wall.

3. The turbine engine nozzle of claim 1, wherein the core compartment vent nozzle comprises a circular annulus around the complete circumference of the engine tail cone.

4. The turbine engine nozzle of claim 3, wherein the core compartment vent nozzle is configured to vent the air around the entire circumference of the engine tail cone into a trailing edge between a fan air flow flowing outside of the single engine core cowl and a core air flow flowing between the primary outer wall and the engine tail cone.

5. The turbine engine nozzle of claim 1, wherein the single core cowl comprises only one core cowl and the turbine engine nozzle lacks any other core cowls.

6. The turbine engine nozzle of claim 1, wherein the turbine engine nozzle lacks any batwing ramp configured to transition the air from the single core cowl.

7. An aircraft engine, comprising
a ducted fan comprising a fan airflow exit configured to exhaust a fan air flow;
a core gas turbine engine comprising:
a core nozzle configured to exhaust a core air flow from the turbine engine core,
a core compartment vent nozzle configured to exhaust a core compartment vent air flow from a core compartment; and
an engine tail cone,
wherein the core compartment vent nozzle is configured to exhaust a compartment vent air flow at a trailing edge between the fan air flow and the core air flow, and
wherein the turbine engine comprises:
a primary outer wall directly coupled to a trailing end of an engine core, and extending from an engine core area to an annular wall terminus that surrounds the engine tail cone, the primary outer wall forming the core nozzle,
a single engine core cowl extending the engine core area to an annular cowl terminus, the single engine core cowl forming a core compartment vent nozzle,
the annular cowl terminus is in substantially planar alignment with the annular wall terminus, and
at the trailing edge between the single engine core cowl and the primary outer wall, the primary outer wall is substantially parallel to the single engine core cowl.

8. The aircraft engine of claim 7, wherein the core compartment vent nozzle comprises an annular gap between the single engine core cowl and the primary outer wall.

9. The aircraft engine of claim 7, further comprising:
an engine cover at least partially enclosing the ducted fan and the turbine engine core.

10. An aircraft comprising:
an aircraft body comprising a fuselage and at least one wing; and
at least one aircraft engine, the at least one aircraft engine comprising:
a ducted fan comprising a fan airflow exit for exhausting a fan air flow, and
a turbine engine core comprising:
a core nozzle configured to exhaust a core air flow from the turbine engine core, and
a core compartment vent nozzle configured to exhaust a core compartment vent air flow from a core compartment; and
an engine tail cone,
wherein the core compartment vent nozzle exhausts core compartment vent air flow through a trailing edge between the fan air flow and the core air flow, and
wherein the turbine engine core comprises:
a primary outer wall directly coupled to a trailing end of an engine core, and extending from an engine core area to an annular wall terminus that surrounds the engine tail cone, the primary outer wall forming the core nozzle
a single engine core cowl the engine core area to an annular cowl terminus, the single engine core cowl forming the core compartment vent nozzle,
the annular cowl terminus is in substantially planar alignment with the annular wall terminus, and
at the trailing edge between the single engine core cowl and the primary outer wall, the primary outer wall is substantially parallel to the single engine core cowl.

11. The aircraft of claim 10, wherein the core compartment vent nozzle comprises an annular gap between the single engine core cowl and the primary outer wall.

12. The aircraft of claim 10, further comprising:
an engine cover at least partially enclosing the ducted fan and the turbine engine core.

13. The aircraft of claim 10, wherein the at least one aircraft engine is coupled to the at least one wing.

14. An aircraft engine, comprising:
  a ducted fan comprising a fan airflow exit configured to exhaust fan air; and
  a turbine engine core comprising:
    an engine core;
    a tail cone at a trailing end of the engine core;
    a primary outer wall around the tail cone, the primary outer wall directly coupling to a trailing edge of the core and extending from an engine core area to an annular wall terminus and forming a core nozzle configured to exhaust core air; and
    an engine core cowl around the primary outer wall, the engine cowl extending from the engine core area to an annular cowl terminus forming a core compartment vent nozzle configured to exhaust core vent air, wherein:
      the core compartment vent nozzle comprises a circular annulus around the complete circumference of the tail cone,
      the core compartment vent nozzle is configured to exhaust the core vent air around the entire circumference of the tail cone into the trailing edge, between the engine core cowl and the primary outer wall,
      the primary outer wall is parallel to the engine core cowl at the trailing edge,
      the annular cowl terminus is in planar alignment with the annular wall terminus around the trailing edge,
      at the trailing edge between the single engine core cowl and the primary outer wall, the primary outer wall is substantially parallel to the single engine core cowl, and
      the turbine engine core lacks any batwing ramp configured to transition the air from the core cowl.

* * * * *